United States Patent
Kaelin

[11] 3,792,284
[45] Feb. 12, 1974

[54] ELECTRO-OPTIC TRANSMISSION LINK

[75] Inventor: Oscar J. Kaelin, Harvard, Mass.

[73] Assignee: GTE Sylvania Incorporated, Stamford, Conn.

[22] Filed: Oct. 13, 1972

[21] Appl. No.: 297,317

[52] U.S. Cl............. 250/551, 250/217 SS, 250/227
[51] Int. Cl. ............................................ G02b 5/14
[58] Field of Search ............ 250/227, 217 S, 217 SS

[56] References Cited
UNITED STATES PATENTS

| | | | |
|---|---|---|---|
| 3,663,822 | 5/1972 | Uchida | 250/227 |
| 2,569,127 | 9/1951 | Eltenton | 250/227 |
| 3,423,594 | 1/1969 | Galopin | 250/227 |
| 2,709,367 | 5/1955 | Bohnet | 250/227 |

*Primary Examiner*—James W. Lawrence
*Assistant Examiner*—Harold A. Dixon
*Attorney, Agent, or Firm*—David M. Keay; Elmer J. Nealon; N. O'Malley

[57] ABSTRACT

An electro-optic link for transmitting signals including a length of flexible fiber optic light guide, a light emitting diode (LED), and a photo-diode. One end of the light guide and the LED are mounted in fixed relationship in a first coupling having electrical connector pins for mating with a receptacle in one unit of a system. The other end of the light guide and the photo-diode are mounted in fixed relationship in a second coupling having electrical connector pins for mating with a receptacle in another unit of the system. The electro-optic link provides a unitary structure for transmitting signals from one unit of a system to another unit. Electrical signals from the one unit are converted to light signals by the LED, the light signals are transmitted by the flexible fiber optic light guide to the photo-diode, and are reconverted to electrical signals by the photo-diode for utilization in the other unit.

7 Claims, 3 Drawing Figures

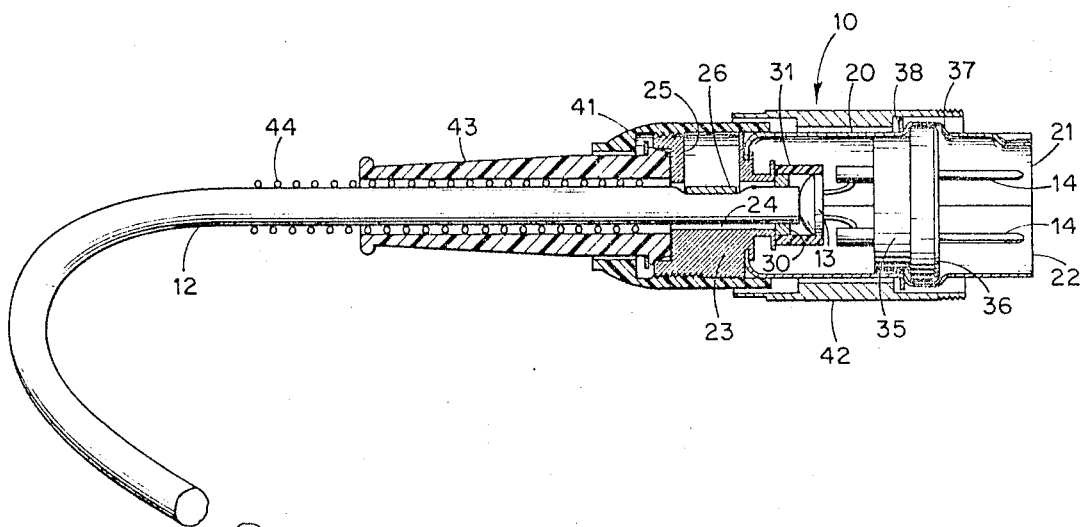
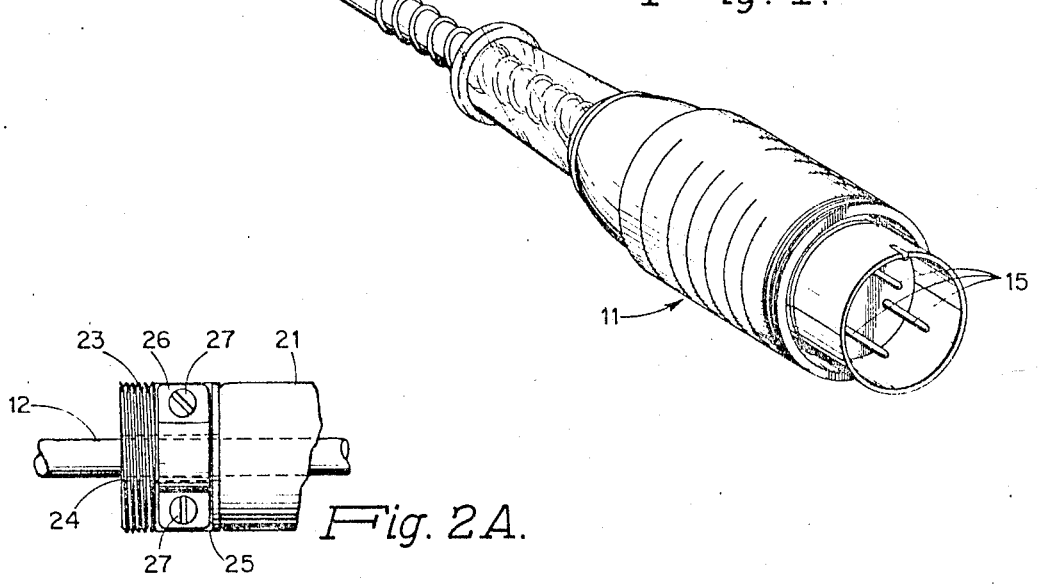
Fig. 1.
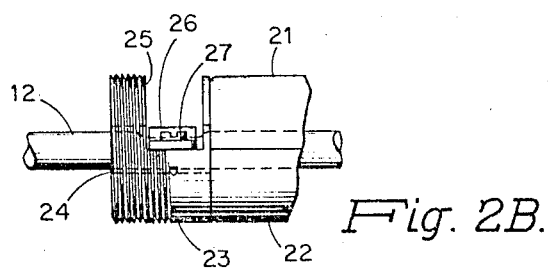
Fig. 2A.
Fig. 2B.

ELECTRO-OPTIC TRANSMISSION LINK

BACKGROUND OF THE INVENTION

This invention relates to the transmission of signals over combinations of electrical and optical transmission paths. More particularly, it is concerned with devices for coupling fiber optic light guides and photo-electric transducing elements.

For certain applications it is desirable to transmit signals between two units of a system over a closed non-conductive non-electrical transmission path. Such a path may be provided by a light pipe employing a flexible fiber optic light guide. Electrical signals are converted to light signals in one unit of the system and the light signals are transmitted by way of the fiber optic light guide to a second unit where they are reconverted to electrical signals. Thus, the two units of the system can be completely electrically isolated from each other and no electrical interference can affect the signals conducted over the optical transmission path.

In a system of the foregoing type the ends of the fiber optic light guide must be properly positioned with respect to photo-electric transducing elements, a light source in the first unit and a photo-sensitive element in the second unit. Heretofore the usual practice has been to assemble the photo-electric transducing elements within the units between which the signals are to be sent, and then attach the fiber optic light guide to the units with the ends in light transmitting-receiving relationship with the photo-electric transducing elements. That is, optical connections were made between the fiber optic light guide and the units of the system. However, each reconnection of the fiber optic light guide to either of the units required careful physical adjustment in order to obtain proper coupling between the end of the light guide and the photo-electric transducing element, and care was necessary to avoid the presence of foreign matter between this interface.

SUMMARY OF THE INVENTION

A unitary photo-electric coupling device in accordance with the present invention provides a permanent fixed coupling between the end of a fiber optic light guide and the photo-electric transducing element. The light transmitting-receiving characteristics therebetween thus remain constant, and connection and disconnection to the units of a system are solely electrical. The unitary coupling device includes a photo-electric transducing element and a flexible fiber optic light guide having a light passing surface at one end. One end of the flexible fiber optic light guide and the photo-electric transducing element are enclosed in a housing. The flexible fiber optic light guide is held in the housing with the light passing surface in fixed position. The photo-electric transducing element is held within the housing in fixed position with respect to the light passing surface of the flexible fiber optic light guide. Electrical connectors are mounted fixed in the housing with portions disposed within the housing and with portions having contact surfaces disposed externally of the housing. Electrical connections connect the portions of the electric connectors within the housing and the photo-electric transducing element.

A length of flexible fiber optic light guide having such coupling devices at each end in which one of the photo-electric transducing elements is a light-to-electricity transducing element and the other photo-electric transducing element is an electricity-to-light transducing element provides an electro-optic link for receiving signals in electrical form, transmitting them as light signals, and reconverting the signals to electrical form.

BRIEF DESCRIPTION OF THE DRAWINGS

Additional objects, features, and advantages of unitary photo-electric coupling devices in accordance with the present invention will be apparent from the following detailed discussion together with the accompanying drawings wherein:

FIG. 1 illustrates an electro-optic link including a length of flexible fiber optic light guide with a photo-electric coupling device at one end shown in cross-section and with a photo-electric coupling device at the opposite end shown in perspective;

FIG. 2A is a view of a portion of an element of the coupling device for clamping the flexible fiber optic light guide in the coupling device; and FIG. 2B is a view of the element illustrated in FIG. 2A shown at an angle of 90° from the view of FIG. 2A.

DETAILED DESCRIPTION OF THE INVENTION

An electro-optic link in accordance with the invention as illustrated in FIG. 1 of the drawing includes two unitary couplings 10 and 11, one at each end of a length of flexible fiber optic light guide 12. The coupling devices each include a photo-electric transducing element, one of which is a light-to-electricity transducer such as a photo-diode and the other is an electricity-to-light transducing element such as a light emitting diode (LED). For purposes of discussion herein, the photo-electric transducing element 13 in the first coupling 10 shown in cross-section will be considered the light source or LED. The LED 13 within the first coupling 10 is connected to connector pins 14, and the photo-sensitive element within the second coupling 11 is connected to connector pins 15. The connector pins 14 and 15 are arranged differently so as to identify the electrical input from the electrical output and to prevent improper connection to mating receptacles. When the couplings are attached to their mating receptacles in the units of a system, electrical signals are conducted by the connector pins 14 to the LED 13 and converted to light signals. The light signals are transmitted by the fiber optic light guide 12 to the photo-sensitive element in the second coupling 11 where they are reconverted to electrical signals. These electrical signals are conducted by the conductor pins 15 to the other unit of the system for processing or utilization.

The coupling devices 10 and 11 are modifications of known types of electrical connectors which are commonly employed with electrical cable. The two coupling devices 10 and 11 are essentially the same, the only difference between the type of transducing element and the physical arrangement of the conductor pins in order to distinguish the input device 10 and the output device 11.

The input coupling 10 includes a housing 20 of two halves 21 and 22 of a cylindrical shell and an end section 23. The upper cylinder half 21 is welded to the end section 23, and the lower half 22 engages a groove in the end section 23. Portions of the housing including the end section are illustrated in FIGS. 2A and 2B with the light guide 12 indicated in phantom. The housing 20 forms a chamber and a central opening 24 through the end section 23 receives the light guide 12 with one end of the light guide disposed within the chamber. A recess 25 in the upper half of the end section 23 receives a clamping plate 26 which is fastened against the bottom half of the end section 23 by screws 27 to firmly clamp the light guide 12 to the housing 20.

The end portion of the light guide 12 is encircled by a collar 30 which further supports the light guide in the housing. The LED 13 is positioned closely adjacent the end of the light guide 12 so as to be in light transmitting-receiving relationship therewith. The LED is held in position by a sleeve 31 which encircles and is fixed to the collar 30 and to the LED. Once the physical relationship between the LED 13 and the light passing end of the fiber optic light guide 12 is properly adjusted, it remains fixed. After this relationship has been established, the end portion of the chamber within the housing containing the LED and the end of the light guide may be filled with a suitable insulating potting material (not shown) to insure that their relative positions will not be disturbed.

The chamber is closed at the other end by a plug 35 of insulating material having a boss 36 which fits within a groove 37 in the halves of the housing. A retaining ring 38 holds the halves together with the plug 35 retained in position. The electrical connector pins 14 pass through the insulating plug 35 with portions lying within the chamber and with portions having contact surfaces for engagement with a suitable receptacle disposed outside the chamber. Electrical lead wires are connected from the LED 13 to the connector pins 14.

Portions of the two halves 21 and 22 of the housing extend beyond the contact surfaces of the connector pins 14 to provide shielding and protection. A sleeve 41 of insulating material encircles the end section 23 of the housing and is threaded thereto. A gripping member 42 for handling the coupling device encircles the housing 20. The gripping member 42 moves axially within a limited range as permitted by shoulders on the gripping member abutting the sleeve 41 and the retaining ring 38. The end of the gripping member 42 is threaded to mate with threads in an electrical receptacle for receiving the coupling device. A plastic flexible strain relief member 43 and a bend relief coil 44 are included to prevent abrupt bends in the light guide in the region adjacent to the coupling.

In assembling the coupling device 10 at the end of the light guide 12, the sleeve 41, the gripping member 42, the combination of the strain relief member 43 and the coil 44, and the retaining ring 38 are strung onto the light guide 12 in that order. The end of the light guide 12 is then passed through the central opening 24 of the end section 23 of the housing 20 and clamped in place with clamping plate 26 and screws 27. At this point the housing includes only the end section 23 and upper cylinder half 21. The lower cylinder half 22 is detached. Next, the collar 30, sleeve 31, and LED 13 are fixed in position at the end of the light guide 12. Electrical connections are made between the lead wires of the LED 13 and the connector pins 14 in the plug 35. The plug 35 is positioned in the housing with the boss 36 lying in the groove 37 of the upper cylinder half 21. The lower cylinder half 22 is then placed in position with the curved lip at its end engaging a groove in the end section 23. The retaining ring 38 is then passed over the end section 23 and moved into position adjacent the bulge in the cylinder halves caused by the groove 37.

The gripping member 42 is then moved into abutting relationship with the retaining ring 38 and the end of the strain relief member 43 is placed against the end section 23. The sleeve 41 is then threaded into the end section 23 of the housing to complete the assembly.

A specific example of an electro-optic signal transmission link constructed in accordance with the foregoing description employed a light guide of DuPont Crofon No. 1610, a Monsanto MV3 LED, and a Monsanto MD1 photo-diode. The LED was driven by a signal current of approximately 250 milliamperes.

The unitary coupling device of the invention as described thus provides structure which permanently positions and secures the light passing end of the fiber optic light guide and a photo-electric transducing element inside a sealed enclosure with electrical connectors from the transducing element to the outside. Once established the interface between the light passing end of the light guide and the photo-electric transducing element remains undisturbed. The force applied in connecting and disconnecting the coupling from an electrical receptacle produces no strain on those elements which establish the relative positions of the end of the light guide and the photo-electric transducer. An electro-optic link having a coupling at each end has electrical input-to-electrical output characteristics which are constant.

While there has been shown and described what is considered a preferred embodiment of the present invention, it will be obvious to those skilled in the art that various changes and modifications may be made therein without departing from the invention as defined in the appended claims.

What is claimed is:

1. A unitary photo-electric coupling device including
a flexible fiber optic light guide having a light passing surface at one end;
a photo-electric transducing element;
a housing for enclosing the one end of the flexible fiber optic light guide and the photo-electric transducing element;
means holding the flexible fiber optic light guide with said surface in fixed position in the housing;
means holding the photo-electric transducing element within the housing in fixed position with respect to said surface of the flexible fiber optic light guide;
electrical connectors mounted fixed in said housing with portions disposed within said housing and with portions having contact surfaces disposed externally of the housing; and
electrical connections between the portions of the electrical connectors within the housing and the photo-electric transducing element;
said means holding the flexible fiber optic light guide including a clamp at one end of the housing for gripping the flexible fiber optic light guide with the surface at said one end disposed within the housing; and
said means holding the photo-electric transducing element including a sleeve member encircling the one end of the flexible fiber optic light guide and the photo-electric transducing element, the one end of the flexible fiber optic light guide and the photo-electric transducing element being fixed to said sleeve member with the surface of the one end of the flexible fiber optic light guide and the photo-electric transducing element in light transmitting-receiving relationship.

2. A unitary photo-electric coupling device in accordance with claim 1 including a plug of insulating material adjacent to the other end of the housing whereby the housing including said clamp and said plug define an enclosed chamber containing the one end of the flexible fiber optic light guide, the sleeve member, and the photo-electric transducing element;

and wherein said electrical connectors are mounted in and extend through said plug with portions within the chamber and with the portions having contact surfaces external of the chamber.

3. A unitary photo-electric coupling device in accordance with claim 2 including gripping means attached to and encircling said housing for handling the device when inserting and removing the portions of the electrical connectors having contact surfaces in and from a mating receptacle, whereby the elements of structure establishing the fixed relationship between the surface at the end of the flexible fiber optic light guide and the photo-electric transducing element are not subjected to stress.

4. An electro-optic link for transmitting signals including a flexible fiber optic light guide having light passing surfaces at each end;

a light-to-electricity transducing element;

an electricity-to-light transducing element;

a first housing for enclosing one end of the flexible fiber optic light guide and the light-to-electricity transducing element;

means holding the flexible fiber optic light guide with the surface at said one end in fixed position in the first housing;

means holding the light-to-electricity transducing element within the first housing in fixed position with respect to the surface at said one end of the flexible fiber optic light guide;

first electrical connectors mounted fixed in said first housing with portions disposed within said first housing and with portions having contact surfaces disposed externally of the first housing;

electrical connections between the portions of the first electrical connectors within the first housing and the light-to-electricity transducing element;

a second housing for enclosing the other end of the flexible fiber optic light guide and the electricity-to-light transducing element;

means holding the flexible fiber optic light guide with the surface at said other end in fixed position in the second housing;

means holding the electricity-to-light transducing element within the second housing in fixed position with respect to the surface at said other end of the flexible fiber optic light guide;

second electrical connectors mounted fixed in said second housing with portions disposed within said second housing and with portions having contact surfaces disposed externally of the second housing; and electrical connections between the portions of the second electrical connectors within the second housing and the electricity-to-light transducing element;

each of said means holding the flexible fiber optic light guide including a clamp at one end of the associated housing for gripping the flexible fiber optic light guide with the surface at the respective end disposed within the associated housing; and each of said means holding a transducing element including a sleeve member encircling the associated end of the flexible fiber optic light guide and the respective transducing element, each end of the flexible fiber optic light guide and the associated transducing element being fixed to the associated sleeve member with the surface at each end of the flexible fiber optic light guide and the associated transducing element in light transmitting-receiving relationship.

5. An electro-optic link in accordance with claim 4 including first and second plugs of insulating material adjacent the other ends of the first and second housings, respectively, whereby each housing including the clamp and the associated plug defines an enclosed chamber, each chamber containing an end of the flexible fiber optic light guide, a sleeve member, and a transducing element;

and wherein said first and second electrical connectors are mounted in and extend through said first and second plugs, respectively, with portions within the chambers and with portions having contact surfaces external of the chambers.

6. An electro-optic link in accordance with claim 5 including first and second gripping means attached to and encircling said first and second housings, respectively, for handling the respective housing and associated elements when inserting and removing the portions of the respective electrical connectors having contact surfaces in and from mating receptacles, whereby the elements of structure establishing the fixed relationship between the surface at an end of the flexible fiber optic light guide and the associated transducing element are not subjected to stress.

7. An electro-optic link in accordance with claim 6 wherein said first and second electrical connectors are disposed in different physical arrangements whereby the assembly of elements including the light-to-electricity transducing element is distinguishable from the assembly of elements including the electricity-to-light transducing element.

* * * * *